(12) United States Patent
Williams

(10) Patent No.: US 6,351,627 B1
(45) Date of Patent: Feb. 26, 2002

(54) SEND/RECEIVE COMMUNICATION BY DELAYED AUDIO PACKETS

(75) Inventor: Ralph E. Williams, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/292,061

(22) Filed: Apr. 14, 1999

(51) Int. Cl.[7] .................................................. H04Q 7/20
(52) U.S. Cl. ............................. 455/72; 455/18; 370/521
(58) Field of Search ........................ 455/517, 72, 422, 455/466, 31.3, 18, 423, 564, 565, 412; 370/521, 477, 301, 468, 465; 379/88.07, 88.08, 88.09, 88.1

(56) References Cited

U.S. PATENT DOCUMENTS

| | | | | |
|---|---|---|---|---|
| 4,394,760 A | * | 7/1983 | Kammerlander | 370/328 |
| 4,821,310 A | * | 4/1989 | Lynk, Jr. et al. | 455/72 |
| 5,109,525 A | * | 4/1992 | Nichols | 455/74 |
| 5,231,632 A | * | 7/1993 | Yamao et al. | 370/331 |
| 5,511,074 A | * | 4/1996 | Lam et al. | 370/465 |
| 5,555,447 A | * | 9/1996 | Kotzin et al. | 455/72 |
| 5,598,543 A | * | 1/1997 | Notarianni et al. | 710/129 |
| 5,629,976 A | * | 5/1997 | Loke et al. | 370/280 |
| 5,633,862 A | * | 5/1997 | Suzuki et al. | 370/280 |
| 5,734,969 A | * | 3/1998 | Shiraishi et al. | 455/72 |
| 5,784,006 A | * | 7/1998 | Hochstein | 340/905 |
| 5,867,493 A | * | 2/1999 | Zisapel | 370/351 |
| 5,894,473 A | * | 4/1999 | Dent | 370/342 |
| 5,940,479 A | * | 8/1999 | Guy et al. | 379/93.01 |
| 6,002,694 A | * | 12/1999 | Yoshizawa et al. | 370/486 |
| 6,002,719 A | * | 12/1999 | Parvulescu et al. | 375/240 |
| 6,058,165 A | * | 5/2000 | Sato | 379/88.07 |
| 6,064,876 A | * | 5/2000 | Ishida et al. | 455/412 |
| 6,122,270 A | * | 9/2000 | Whinnett et al. | 370/342 |

* cited by examiner

Primary Examiner—Dwayne Bost
Assistant Examiner—Jean A Gelin
(74) Attorney, Agent, or Firm—Ronald O. Neerings; Wade James Brady III; Frederick J. Telecky, Jr.

(57) ABSTRACT

A method of communication and the communication system wherein, there is provided a first telephone for receiving information, time-compressing the information, storing the information and transmitting the information to a central station. There is provided at least one and generally a plurality of spaced apart central stations for receiving the time-compressed information from the first telephone, storing the time-compressed information and retransmitting the time-compressed information to a second telephone. A second telephone is provided for receiving the time-compressed information from the central station, one of storing the time-compressed information and, responsive to call-up, time-decompressing and transmitting the time-decompressed information or time-decompressing the time-compressed information and storing the time-decompressed information and then, responsive to call-up, transmitting the time-decompressed information. A feedback signal is provided from the central station to the first telephone responsive to reception of the time-compressed information at the central station and a feedback signal is provided from the second telephone to the central station responsive to reception of the time-compressed information at the second telephone. Both the first telephone and the central station, when having information in storage for transmission, continually attempt to access the central station and second telephone respectively until access is obtained.

24 Claims, 1 Drawing Sheet

SEND/RECEIVE COMMUNICATION BY DELAYED AUDIO PACKETS

BACKGROUND OF THE INVENTION

1. Field of the Invention

This invention relates to a method of transmitting information over the radio frequency spectrum, generally on a one way basis, which materially improves the efficiency of such transmission.

2. Brief Description of the Prior Art

The radio frequency (RF) spectrum is known to be finite. Accordingly, with the increasingly greater use of radio frequencies and equipment requiring the use of radio frequencies, the availability of such frequencies at any particular point in time becomes increasingly problematical. Accordingly, in some geographical areas, access at any particular time to radio frequencies for information transmission may not be and presently often is not available when requested. In fact, it is well known that only a small fraction of the total population of large cities can be accommodated with cellular telephone technology, this being an example of this problem. It is therefore apparent that there is a present need to adopt improved technology and/or the improved and more efficient use of the present technology to ameliorate this problem.

One level of communication technology which utilizes the radio frequency spectrum is the pager technology and particularly the portion of this technology which operates on a send only basis, this being communication which operates mainly in one direction. At present, even this technology is subject to the above described problem of radio frequency access since it operates in the same frequency ranges as do other technologies. A problem generally inherent in all of the present technologies which transmit via radio frequencies is that the data being transmitted, whether analog or digital, is generally transmitted at the speed at which it was originally created including pauses between periods of data creation or "dead time". This causes a utilization of the radio frequency during access for a greater period of time than may be necessary to adequately transmit the data as well as utilization during periods of non-use.

SUMMARY OF THE INVENTION

In accordance with the present invention, the above described problem inherent in the present prior art is minimized and there is provided a method of transmission of data, generally in one direction, for use in conjunction with pager-type equipment, which materially decreases the time required for transmission of such data.

Briefly, in accordance with the present invention, there is provided a wireless communication system in which a brief message, which can be an analog message, such as an audible message, or a digital message, such as an audible message which has been converted to digital code or an originally created digital message, is stored at the transmitter, time-compressed, generally with but not limited to a digital signal processor (DSP) and transmitted when radio frequency spectrum space is available as a brief burst of transmission requiring far less transmission time than would be required for creation of the original data due to the data time-compression. In a typical operation, the user will dial the number of the station which is to receive the message and then create the message in a telephone, such as a cellular telephone. The telephone will include circuitry which compresses and stores the number of the station being called and the message created, whether analog, analog converted to digital or digital, and transmits the compressed message to a predetermined central station (as is the case of all cellular telephones) as soon as RF spectrum space is available. In the event the telephone is not equipped to time-compress the data, the data can be transmitted in uncompressed form to a central station and time-compressed at the central station. It is understood that there are generally a plurality of spaced apart central stations, each capable of receiving from and transmitting to and from the telephones as well as to and from other central stations. When there are plural central stations in use, generally all of the central stations are capable of receiving and transmitting concurrently to and from each telephone as well as to and from each other in order to be able to locate the receiver telephone anywhere within the total area being covered by the system. This is accomplished by standard repetitive redial in the event space is initially not available. The time-compressed message and address of the station to receive the message, when received, is stored at the central station and optionally provides an answer back to the transmitting station indicating that the message has been received and stored at the central station. The central station then transmits the time-compressed message to the station to receive the message by dialing the stored address of the receiving station as soon as radio frequency spectrum is available, using the redial as discussed above if space is initially not available, and can optionally receive an answer back from the receiving station to indicate that the message has been received at the receiving station. The receiving station time-decompresses and stores the original message for replay and notifies the user at the receiving station that a message has been stored by conventional procedures, such as, for example, a ring, beep, vibration, etc. The receiving user can then play the message when convenient. The receiving station can be another cellular telephone or a telephone connected to regular telephone lines with the ability to time-decompress and store as noted above with regard to the cellular telephone receiving station.

As a further embodiment, the data, whether analog (audio) or digital (analog converted to digital or original digital) can be transmitted via a PC through the internet to an E-mail address using the above described concepts.

It can be seen that the time period during which the radio frequency spectrum is utilized is greatly reduced due to the time-compression and time-decompression of the message and can be limited to the time required to transmit the highly time-compressed message alone with avoidance of the dead time. It is noted that the terms "time-compression" and "time-decompression" relate to the time required to send a message and that these terms are in no way related to the use of algorithms and processing used to minimize the number of bits required to adequately represent speech which is another form of data compression.

While the above description relates specifically to cellular type telephones which have been additionally fitted with a DSP or other type of device capable of performing the above described functions, it should be understood that standard type telephones can also be provided with the above described capability by calling via standard telephone lines to a specially provided service number, preferably at the cellular telephone central station, which telephone has the capability of performing the functions of the DSP or other type of device and proceeding as described above. Such operation still saves radio frequency spectrum time for telephone calls from a telephone which uses the regular telephone lines to a cellular type telephone which uses radio frequencies as a means of transmission and reception of information.

DESCRIPTION OF THE PREFERRED EMBODIMENT

Figure 1:
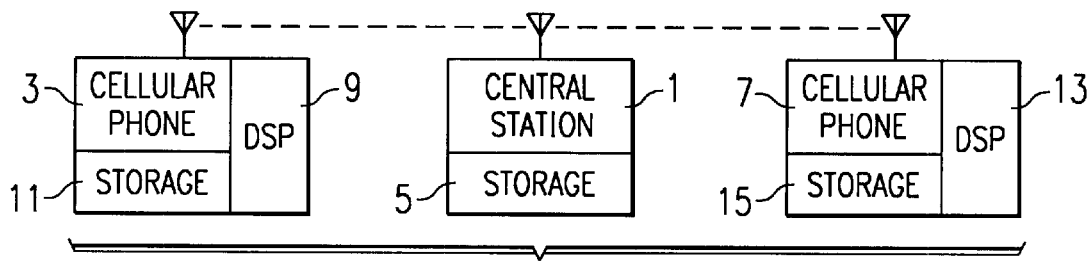
FIG. 1 is a schematic diagram of a communication system in accordance with a first embodiment of the present invention using standard communication between a pair of cellular telephones.

Referring first to FIG. 1, there is shown a communication system in accordance with a first embodiment of the present invention. The system includes a central station 1 which is representative of a single central station or a plurality of spaced apart central stations of the type used in cellular telephony, each central station being capable of receiving information from a cellular telephone 3, storing the information in a storage 5 and transmitting information when space is available to a cellular telephone 7 as well as being capable of transmitting and receiving between central stations. The cellular telephone 3 includes a digital signal processor (DSP) 9 which time-compresses the data created at the cellular telephone 3 and stores the data in a storage 11. The time-compressed data in storage 11 is then transmitted to the central station 1 for storing in storage 5 when the cellular telephone 3 is able to communicate with the central station. The central station 1 can also provide an answer back signal to the cellular telephone 3 to indicate reception of the data. When the central station 1 is able to communicate with the cellular telephone 7, the time-compressed data in storage 5 is transmitted to cellular telephone 7 and either stored in storage 15 for later time-decompression by DSP 13 or time-decompressed initially by DSP 13 and stored. The cellular telephone 7 can also provide an answer back to the central station 1 indicative of reception of the transmission. The cellular telephone 7 also provides a signal to the user to indicate that a message is stored therein. The user can then listen to the time-decompressed message at his or her leisure.

Figure 2:
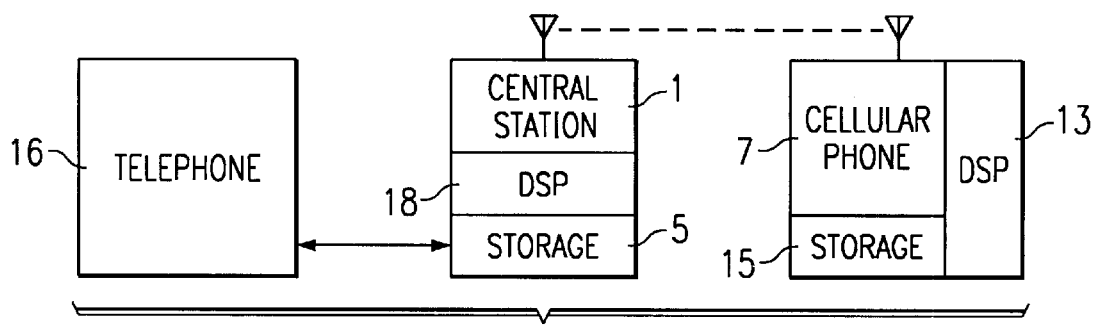
FIG. 2 is a schematic diagram of a communication system in accordance with a second embodiment of the present invention using communication between a standard telephone and a cellular telephone receiving station.

Referring to FIG. 2, there is shown a communication system in accordance with a second embodiment of the present invention. The system includes a central station 1 which can be the same central station 1 but be capable of receiving information from a cellular telephone 3 or a regular telephone 16. The regular telephone 16 in this embodiment is not equipped with a storage and a DSP (both not shown) as in FIG. 1, for time-compressing and storing the information and transmitting information when space is available to the central station 1 as described with reference to the first embodiment, this structure being a part of the central station 1. In this case, the regular telephone 16 calls the central station by calling a special service number for time-compressed transmission which connects the telephone 16 with the central station 1. The central station 1 then receives the non-time-compressed data from the telephone 16 and performs the time-decompression thereat in a DSP 18 or the like. The central station 1 can also optionally provide an answer back signal to the cellular telephone 16 to indicate reception of the data. When the central station 1 is able to communicate with the cellular telephone 7 or another central station which is capable of communicating with the cellular telephone 7, the time-compressed data in storage 5 is transmitted to cellular telephone 7 and either stored in storage 15 for later time-decompression by DSP 13 or time-decompressed initially by DSP 13 and stored. The cellular telephone 7 can also provide an answer back to the central station 1 indicative or reception of the transmission. The cellular telephone 7 also provides a signal to the user to indicate that a message is stored therein. The user can then listen to the time-decompressed message at his or her leisure. It can be seen that, in the embodiment of FIG. 2, the telephone 7 can be the transmitting telephone and the telephone 16 can be the receiving telephone. In this case, the data from telephone 7 is time-compressed prior to transmission to the central station 1 with the time-compressed data being stored and time-decompressed at the central station and transmitted as non-compressed data to the telephone 16.

Figure 3:
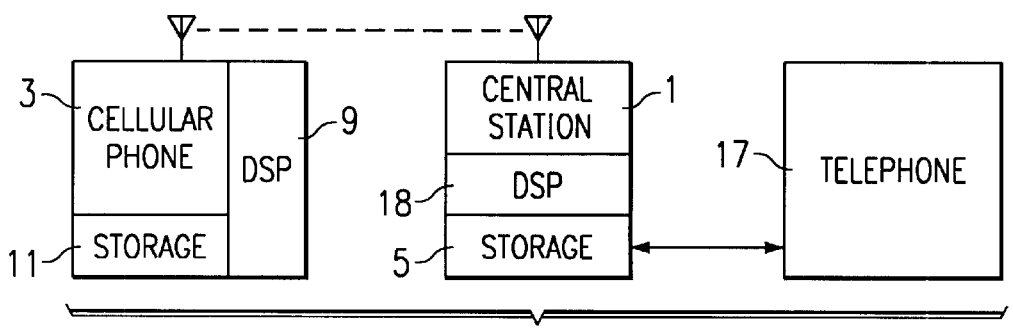
FIG. 3 is a schematic diagram of a communication system in accordance with a third embodiment of the present invention using communication between a cellular telephone and a standard telephone.

Referring to FIG. 3, there is shown a communication system in accordance with a third embodiment of the present invention. The system includes a central station 1 which can be the same central station 1 of FIGS. 1 or 2 and capable of receiving and storing information from a cellular telephone 3 which is equipped with a DSP 9 and storage 11 as in FIG. 1. When a standard cellular telephone 17 without the DSP or storage is available for reception, the stored data is time-decompressed in DSP 18 transmitted in time-decompressed form to the telephone 17 for immediate use. The telephone 17 can also optionally provide an answer back to the central station 1 indicative of reception of the transmission.

Though the invention has been described with reference to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A communication system which comprises:
   (a) a first telephone for transmitting a telephone identifier signal and information in the form of a message including circuitry for time-compressing said information, circuitry for storing said time-compressed information and circuitry for transmitting said time-compressed information as a burst of said time-compressed information to a central station from said circuitry for storing said time-compressed information;
   (b) a second telephone for receiving said information including circuitry responsive to establishment of communication with a central station for time-decompressing said time-compressed information; and
   (c) at least one central station for receiving and storing said time-compressed information from said first telephone and, responsive to establishment of communication with said second telephone, transmitting said stored time-compressed information to said second telephone.

2. The system of claim 1 wherein said circuitry for time-compressing and time-decompressing comprises a digital signal processor.

3. The system of claim 1 wherein at least one of said first and second telephones is a mobile cellular telephone.

4. The system of claim 2 wherein at least one of said first and second telephones is a mobile cellular telephone.

5. A communication system which comprises:
   (a) a first telephone for transmitting a telephone identifier signal and information in the form of a message including circuitry for time-compressing said information, circuitry for storing said time-compressed information and circuitry for transmitting said time-compressed information as a burst of said time-compressed information to a central station from said circuitry for storing said time-compressed information;

(b) a second telephone for receiving information from said central station in response to a establishment of communication with said central station; and (c) at least one central station for receiving and storing said time-compressed information from said first telephone, storing said time-compressed information and transmitting said stored time-decompressed information to said second telephone responsive to establishment of communication with said second telephone.

6. The system of claim 5 wherein said circuitry for time-compressing and time-decompressing comprises a digital signal processor.

7. The system of claim 6 wherein at least one of said first and second telephones is a mobile cellular telephone.

8. The method of claim 6 wherein at least one of said first and second telephones is a mobile cellular telephone.

9. The system of claim 5 wherein at least one of said first and second telephones is a mobile cellular telephone.

10. A communication system which comprises:

(a) a first telephone for transmitting a telephone identifier signal and information in the form of a message;

(b) a second telephone for receiving information including circuitry for storing time-compressed information and, responsive to establishment of communication with a central station, time-decompressing time-compressed information; and (c) at least one central station for receiving and storing said information from said first telephone, time-compressing and storing said time-compressed information and responsive to establishment of communication with said second telephone, transmitting said stored time-compressed information at said second telephone.

11. The system of claim 10 wherein said circuitry for time-compressing and time-decompressing comprises a digital signal processor.

12. The system of claim 10 wherein at least one of said first and second telephones is a mobile cellular telephone.

13. The system of claim 11 wherein at least one of said first and second telephones is a mobile cellular telephone.

14. A communication method which comprises the steps of:

(a) providing a first telephone for transmitting a telephone identifier signal and information in the form of a message including circuitry for time-compressing said information, circuitry for storing said time-compressed information and circuitry for transmitting said time-compressed information as a burst of said time-compressed information to a central station from said circuitry for storing said time-compressed information;

(b) providing a second telephone for receiving information including circuitry for storing time-compressed information and, responsive to call-up, time-decompressing and transmitting said time-decompressed information;

(c) providing at least one central station for receiving and storing said time-compressed information from said first telephone and transmitting said stored time-compressed information to said second telephone;

(d) time compressing said information at said first telephone with said circuitry for time compressing at said first telephone and storing the time compressed information in said circuitry for storing said time compressed information at said first telephone;

(e) transmitting said time-compressed information from said circuitry for storing at said first telephone to said at least one central station as a burst of said time-compressed information responsive to availability of transmission spectrum to said central station determined at said first telephone;

(f) storing said time compressed information at said at least one central station; and (g) responsive to establishment of communication between said at least one central station and said second telephone, transmitting said time-compressed information stored at said central station from said central station to said second telephone.

15. The method of claim 14 wherein said circuitry for time-compressing and time-decompressing comprises a digital signal processor.

16. The method of claim 14 wherein at least one of said first and second telephones is a mobile cellular telephone.

17. The method of claim 15 wherein at least one of said first and second telephones is a mobile cellular telephone.

18. A communication method which comprises the steps of:

(a) providing a first telephone for transmitting a telephone identifier signal and information in the form of a message including circuitry for time-compressing said information, circuitry for storing said time-compressed information and circuitry for transmitting said time-compressed information as a burst of said time-compressed information to a central station from said circuitry for storing said time-compressed information;

(b) providing a second telephone for receiving information;

(c) providing at least one central station for receiving and storing said time-compressed information from said first telephone, time-decompressing said stored information and transmitting said stored time-decompressed information to said second telephone;

(d) time compressing said information at said first telephone with said circuitry for time compressing at said first telephone and storing the time compressed information in said circuitry for storing said time compressed information at said first telephone;

(e) transmitting said time-compressed information from said circuitry for storing at said first telephone to said at least one central station as a burst of said time-compressed information responsive to availability of transmission spectrum to said central station;

(f) storing said time compressed information at said at least one central station; and (g) responsive to establishment of communication between said at least one central station and said second telephone, transmitting said time-decompressed information from said central station to said second telephone.

19. The method of claim 18 wherein said circuitry for time-compressing and time-decompressing comprises a digital signal processor.

20. The method of claim 18 wherein at least one of said first and second telephones is a mobile cellular telephone.

21. A communication method which comprises the steps of:
(a) providing a first telephone for transmitting a telephone identifier signal and information in the form of a message;
(b) providing a second telephone for receiving said information including circuitry for storing said time-compressed information and circuitry for time-decompressing said time-compressed information;
(c) providing at least one central station for receiving and storing said information from said first telephone, time-compressing and storing said time-compressed information from said first telephone and transmitting said stored time-compressed information to said second telephone;
(d) transmitting said information from said first telephone to said at least one central station responsive to the establishment of communication between said first telephone to said at least one central station;
(e) time compressing and storing said time compressed information from said first telephone at said at least one central station; and
(f) responsive to establishment of communication between said at least one central station and said second telephone, transmitting said time-compressed information as a burst of information from said at least one central station to said second telephone.

22. The method of claim 21 wherein said circuitry for time-compressing and time-decompressing comprises a digital signal processor.

23. The method of claim 21 wherein at least one of said first and second telephones is a mobile cellular telephone.

24. The method of claim 22 wherein at least one of said first and second telephones is a mobile cellular telephone.

* * * * *